(No Model.)
P. DEISSLER.
DEVICE FOR CONVERTING MOTION.
No. 342,586. Patented May 25, 1886.
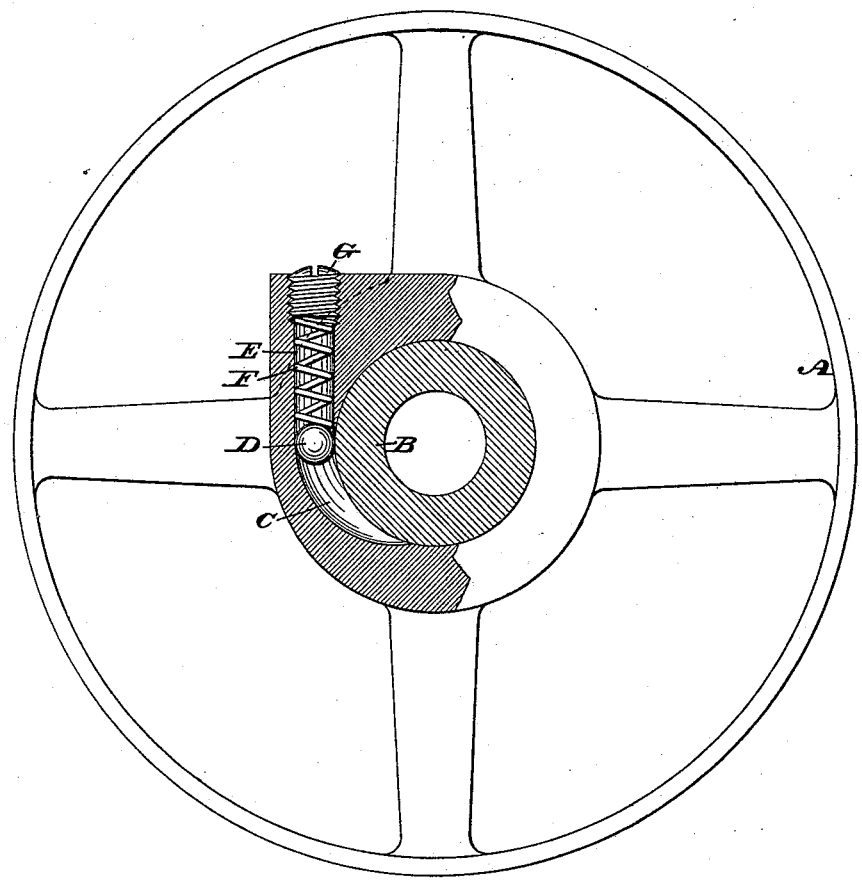

UNITED STATES PATENT OFFICE

PETER DEISSLER, OF PHILADELPHIA, PENNSYLVANIA, ASSIGNOR OF ONE-HALF TO WILLIAM DEISSLER, OF SAME PLACE.

DEVICE FOR CONVERTING MOTION.

SPECIFICATION forming part of Letters Patent No. 342,586, dated May 25, 1886.

Application filed October 14, 1885. Serial No. 179,894. (No model.)

*To all whom it may concern:*

Be it known that I, PETER DEISSLER, a citizen of the United States, residing in the city and county of Philadelphia, State of Pennsylvania, have invented a new and useful Improvement in Converting Motion, which improvement is fully set forth in the following specification and accompanying drawing, in which the figure is a partial side elevation and partial section of a device for converting motion embodying my invention.

Various devices have been made for converting motion embodying pawls and ratchets, friction-balls, wedging-cylinders, rollers, &c., but in none of them, as far as I know, is provision made for access to the pawls, balls, &c., without disturbing or removing the wheels or shafts of the devices. This want is supplied by my invention, as will be hereinafter fully set forth.

Referring to the drawings, A represents a wheel, and B a shaft on which said wheel is loosely mounted, so that either part may be rotated in one direction without imparting motion to the other part, as is well known in the class of lawn-mowers where the rotary cutter or cylinder is alternately operated and permitted to be at rest as the mower is advanced and run back. In the hub of the wheel is a groove, C, one side of which opens at the surface of the shaft B, so that the friction ball or sphere, cylinder, or other device D, located in said groove, is permitted to come in contact with said shaft, the groove widening as it extends outwardly, so that as the ball enters the narrow part it is wedged between the hub of the wheel and the shaft, thus coupling said parts so that they rotate together, and as said ball enters the wide part of the groove the ball is inoperative, and the shaft and wheel may be rotated independently of each other, or the motion of one part is not communicated to the other. In the hub is a passage or bore, E, which communicates with the groove C, and is open at the surface of the hub so that access is had to the groove, and thus the ball may be located in and removed from the groove without displacing or otherwise disturbing the shaft or wheel. Within the bore is a coiled or other spring, F, one end of which is in contact with the ball D and forces the same toward the groove C, so that said ball is unfailingly directed into said groove and prevented from improperly occupying the passage or bore E, so that it is always in position to be wedged between the wheel and shaft. The spring is in contact with a plug, G, which is screwed to the wall of the bore at the outer termination thereof, and serves to prevent loss of the ball and spring, adjust the tension of the spring, and prevent entrance of dirt to the groove. The lubricating material for the shaft and hub of the wheel may be admitted through the bore E, the plug being removed, said plug being afterward reapplied and preventing escape of said material.

Having thus described my invention, what I claim as new, and desire to secure by Letters Patent, is—

1. A wheel and shaft with a friction device, substantially as described, the hub of said wheel having a groove opening at the surface of the shaft and receiving said friction device and communicating with a passage or bore leading to the exterior surface of the hub, as stated.

2. A wheel having in its hub a groove and a passage or bore, in combination with a friction device, substantially as described, and a plug closing said bore, the groove and bore being in communication, as stated.

3. A wheel having in its hub a groove and a passage or bore, in combination with a friction device, substantially as described, a spring and a plug closing the bore, said spring bearing against said device and plug, as stated.

PETER DEISSLER.

Witnesses:
JOHN A. WIEDERSHEIM,
A. P. GRANT.